(12) United States Patent
Lee

(10) Patent No.: US 6,913,116 B2
(45) Date of Patent: Jul. 5, 2005

(54) VEHICLE DRIP TRAY AND PET WASTE PAN

(76) Inventor: Elliot W. Lee, 1032 Tustin Pines Way, Tustin, CA (US) 92780-2858

(*) Notice: Subject to any disclaimer, the term of this patent is extended or adjusted under 35 U.S.C. 154(b) by 119 days.

(21) Appl. No.: 10/266,749

(22) Filed: Oct. 9, 2002

(65) Prior Publication Data

US 2004/0069571 A1 Apr. 15, 2004

(51) Int. Cl.$^7$ .............................................. F16N 31/02
(52) U.S. Cl. ..................... 184/106; 220/573; 220/810; 296/38; 248/451
(58) Field of Search .................. 184/90, 106; 180/69.1; 428/34.2, 35.7, 532; 220/571, 573, 578, 579, 668, 760, 810, 773–776, 833, 836, 731, 729, 626; 296/38; 281/45; 16/373, 374

(56) References Cited

U.S. PATENT DOCUMENTS

| | | | | |
|---|---|---|---|---|
| 892,661 A | * | 7/1908 | Gottschalk | 206/215 |
| 1,094,210 A | * | 4/1914 | Hughes | 184/106 |
| 1,564,594 A | * | 12/1925 | Leh | 248/448 |
| 2,637,464 A | * | 5/1953 | Vogel, Jr. | 220/669 |
| 2,833,375 A | * | 5/1958 | Lundelius | 184/106 |
| 2,986,235 A | | 5/1961 | Weibert, Jr. | 184/106 |
| 2,990,033 A | | 6/1961 | Arnold | 184/106 |
| 3,086,676 A | * | 4/1963 | Dilatush | 220/833 |
| D213,101 S | | 1/1969 | Delk, Jr. | D14/6 |
| 3,661,227 A | | 5/1972 | Robel et al. | 184/106 |
| 3,983,387 A | * | 9/1976 | Van Steenhoven et al. | 362/375 |
| 4,023,524 A | * | 5/1977 | Goldfarb et al. | 118/301 |
| 4,156,513 A | * | 5/1979 | Rich | 248/451 |
| D263,055 S | | 2/1982 | Perry | D15/150 |
| 4,484,661 A | | 11/1984 | Evenson | 184/106 |
| 4,651,887 A | | 3/1987 | Patrick | 220/1 C |
| 4,750,775 A | | 6/1988 | Miller | 296/38 |
| D309,571 S | | 7/1990 | Lehman | D9/455 |
| 5,011,007 A | | 4/1991 | Kenimer | 206/205 |
| 5,020,638 A | | 6/1991 | Smith | 184/106 |
| 5,205,208 A | * | 4/1993 | Gongwer | 99/345 |
| 5,253,440 A | * | 10/1993 | Chang | 40/748 |
| 5,404,848 A | | 4/1995 | Nelson | 123/188 E |
| D363,944 S | | 11/1995 | McCarter | D15/150 |
| D370,227 S | | 5/1996 | Mosley | D15/150 |
| 5,775,869 A | * | 7/1998 | Bishop | 414/608 |
| 5,916,658 A | | 6/1999 | Mohr | 428/81 |
| 5,928,751 A | | 7/1999 | Van Romer et al. | 428/68 |
| 6,102,086 A | | 8/2000 | Holtby | 141/86 |
| 6,378,639 B1 | | 4/2002 | Murray | 180/69.1 |
| 6,558,769 B1 | * | 5/2003 | Chwala | 428/137 |

FOREIGN PATENT DOCUMENTS

GB 2061438 A * 5/1981 .......... F16B/21/14

* cited by examiner

Primary Examiner—Chong H. Kim
(74) Attorney, Agent, or Firm—Robert Platt Bell

(57) ABSTRACT

The present invention provides a roll-edge stamped metal drip tray with a wire retaining bar hinged at one end and secured at another end by a locking slot. The wire retaining bar holds an absorbent material in the drip pan. The wire retaining bar may be provided at a distance away from the edge of the drip pan to as to prevent the absorbent material from blowing out of the pan. The wire retaining bar may be released from its locking slot an one end, and the bar hinged upwards to a substantially vertical position, where the wire retaining bar is prevented from falling backwards by bends in the retaining bar hinge portion. Once an absorbent material is inserted into the pan, the wire retaining bar may be lowered into position and locked into place using one or more locking slots which accept a suitably formed wire portion.

20 Claims, 2 Drawing Sheets

VEHICLE DRIP TRAY AND PET WASTE PAN

FIELD OF THE INVENTION

The present invention relates to drip tray. In particular, the present invention is directed toward a drip tray with a wire retaining loom for securing an absorbent material.

BACKGROUND OF THE INVENTION

Drip trays are known in the art for containing spills and drips from automobiles and other machinery, as well as from valves, fittings, pipes, and other areas where drip leaks may occur. Catching such leaks is important not only from an aesthetic sense, but also from an environmental and safety aspect as well. If such leaks are allowed to drip onto the floor, the floor coverings or surface may be damaged or marred. Moreover, especially in the case of oil, a slippery condition may exist which may be hazardous to pedestrian or other traffic.

Moreover, many leaking fluids, such as oils and the like from automobiles, are now recognized as an environmental hazard. Oil leaking into groundwater and the like can contaminate groundwater. Oil leaking into runoff water may pass into estuaries and other bodies of water, contaminating such bodies of water as well. As motor oils and the like are now recognized as carcinogens, catching such drips and the like is important for the health and safety of the individual as well as the environment.

For industrial applications, such concerns are even more paramount, as leaking industrial fluids may be much more hazardous, particularly for toxic fluids and radioactive fluids and the like. Despite advances in seal and valve technology, in a large industrial plant, it is likely that one or more valve packings, joint seals, or the like, may develop slight leaks over time which are difficult and expensive to repair. The use of drip trays in such industrial applications is known in instances where seal or valve repair is not immediately practical or cost-effective.

An example of such a commercially available drip pan is that sold by Auto Trend Products. This drip tray is formed of stamped metal (e.g., steel, aluminum, or the like) with a rolled edge similar to that of a baking pan. The tray is approximately 18" by 24" and approximately 1½" deep. Such a drip tray may be placed underneath an automobile or other source of dripping leaks to catch such leaks.

While such a tray will catch oil leaks and the like, it does suffer from a number of disadvantages. To begin with, as oil or other fluids drip onto the tray, the fluids may tend to splatter, particularly when the tray starts to fill. Such spatter may spray an amount of fluid into the area surrounding the tray, negating the effect of the drip tray and creating a spillage condition that the tray was designed to prevent. Frequent emptying of the drip tray is required to minimize or prevent such spillage.

In addition, when such a drip tray starts to fill with a significant amount of fluid, it must be emptied. Carrying such a tray can be difficult, as it requires two hands to steady the tray, leaving no hands available to open doors, trash containers, fluid receptacles, or the like. In addition, many such drip trays are very thin and flimsy such that they may flex when a significant amount of fluid is present. A drip tray that subsequently spills its contents again negates the purpose of such a drip tray.

Heavier drip trays are more expensive, and for many applications, cost is critical. Home hobbyists may not be likely to pay more than a few dollars for an oil drip tray before resorting to more home-made remedies. In industrial applications, similar criteria apply. An industrial user may resort to more primitive means (e.g., discarded 5-gallon buckets) if a specialized drip tray is too expensive. Thus, it is critical in any drip-tray design to keep costs at a minimum.

Disposing of fluids, such as motor oil, transmission fluid, and the like from such a drip tray can be problematic. If dumped into a garbage receptacle, it is likely that the fluids will stain the receptacle and moreover leak out of the receptacle (e.g., dumpster, metal garbage can, or the like) creating a fluid spill at the site of the receptacle, again negating the effect of the drip tray.

One idea to reduce spillage, splatter, and to make disposal easier is to put an absorbent material into the drip tray. An absorbent material will absorb the dripping fluid, reduce splatter. The absorbent material may also make disposal easier, as the fluid, trapped in the absorbent material, will not spill as easily, and the absorbent material may be removed and bagged for disposal. Once sealed into a sanitary landfill, the fluids are unlikely to seep into ground water or into runoff waters.

However, merely placing an absorbent material (e.g., newspaper, non-woven spun fabrics, and the like) into an existing drip tray presents additional problems. Wind and the like may blow the materials out of the tray. For example, if a car is backed over such a tray, the wind currents produced by the car may blow the absorbent material out of the tray. If these absorbent materials lodge against hot exhaust parts, a car fire may result. In addition, wind-blown absorbent materials, particularly if saturated with some oil or the like, may actually spread the contaminants instead of containing them, staining adjacent articles and structures and generally creating a large mess which is difficult to clean.

One idea in the Prior Art has been to provide a frame for holding such absorbent materials into a specially designed drip tray. Hughes, U.S. Pat. No. 1,094,210, issued Apr. 21, 1914, and incorporated herein by reference, discloses a drip tray made from what appears to be a wooden picture frame and a sheet of metal. Absorbent material is held in place by the weight of a second frame, which also appears to be a mitered picture-style frame.

The Hughes patent appears to suffer from a number of flaws. To begin with, the frame and metal design of the drip pan would seem to be prone to leakage, not to mention a fairly complex assembly resulting in increased costs. Secondly, the secondary frame, held in place by gravity, may not secure the absorbent sheets from severe winds or disturbances (or if the tray is tipped when moving it from place to place. Third, the second frame, securing the absorbent material at the perimeter, would not seem to hold the absorbent material as well as the present invention. Fourth, the second frame, being of mitered construction, would not lend itself to a rounded-corner stamped metal plan. Fifth, the mitered frame would have to be removed when changing the absorbent material, and as a result the frame, if left on the ground, may leak fluid of its own while the absorbent material is being changed.

In addition, one further problem in the Prior Art has been that vehicle drip trays may tend to get run over by the vehicles they are intended to service or stepped on by users. If run over or crushed, the functionality of the drip tray may be impaired. Thus, it remains a requirement in the art to provide a vehicle drip tray that is crush-resistant.

It has been known in the art to use newspapers to catch pet and animal droppings such as dog waste, bird waste, and the like. While pets can be trained to defecate and urinate on newspaper and other absorbent materials (or such materials can be used as cage liners), similar problems exist as with the fluid drip catchers noted above. In particular, newspaper or the like may blow away or be disturbed by the animal so that the droppings may not be readily cleaned up and in fact, a greater mess created.

Thus, a requirement exists in the art for an inexpensive and readily made drip tray which secures an absorbent material into the tray to catch fluid leaks and the like. Such a drip tray should be inexpensive and easily assembled to reduce costs and complexity. Moreover, it should securely hold the absorbent material against wind currents and the like. In addition, such a drip tray should be easily loaded with absorbent material without complete disassembly such that oil soak parts are not being set aside to create more drips and leaks.

SUMMARY OF THE INVENTION

The drip tray of the present invention provides a roll-edge stamped metal drip pan with a wire retaining bar hinged at one end and secured at another end by a locking slot. The wire retaining bar holds an absorbent material (e.g., newspaper or the like) in the drip pan. The wire retaining bar may be provided at a distance away from the edge of the drip pan to as to prevent the absorbent material from blowing out of the pan.

In use, the wire retaining bar may be released from its locking slot an one end, and the bar hinged upwards to a substantially vertical position. In the upward position, the wire retaining bar is prevented from falling backwards by bends in the retaining bar hinge portion. Thus, any oil on the retaining bar will tend to drip back into the metal drip pan.

Once an absorbent material, such as newspaper, cloth, other types of paper, or specialized absorbent diaper-like materials known in the art is inserted into the pan, the wire retaining bar may be lowered into position and locked into place using one or more locking slots which accept a suitably formed wire portion.

When the drip tray of the present invention is ready to be emptied, the wire retaining bar is again released and moved into its upward, substantially vertical position. The absorbent material may be placed into a plastic bag or the like and easily disposed of without creating further spills, drips or leaks. The drip pan may be reloaded with fresh absorbent material and re-used.

The drip tray of the present invention may be readily, easily, and inexpensively manufactured. An existing drip pan such as that made by AUTO TREND PRODUCTS noted above, may be suitably modified to form the present invention (as in the inventor's prototype) or a specially designed pan may be used. In the preferred embodiment, a stamped, rolled-edge drip pan may be used as such pans may be readily mass-produced inexpensively and easily. Alternatively, other types of pans may be used, such as ones made from flat metal stock with bent edges and corner seams or the like.

The pan is modified for the present invention by cutting, punching, milling, or otherwise forming a slot or slots into one edge to form the locking slot (s) for holding the wire retaining bar in place. At another end of the pan, a hinge or hinges may be formed by punching, milling, or otherwise forming two holes (for each hinge) in the pan edge and then deforming a portion of the pan edge for form a hinge receptacle for accepting a portion of the wire retaining bar.

The wire retaining bar may be suitably formed from metal wire stock (e.g., steel or aluminum wire approximately ⅛" to ¼" in diameter). The metal wire may be bent into a roughly rectangular shape following the contours of the drip pan, however generally smaller in size so as to secure the absorbent material at a distance from the edge of the pan in order to form the wire retaining bar.

At one end of the wire retaining bar, a dimple or dimples may be bent into the wire so as to interact with the locking slot(s). At the other end of the wire retaining bar, end portions may be bent and fed through the hinge receptacles of the drip pan. End portions of the wire retaining bar may be bent at an angle to prevent the end portions from falling out of the hinge receptacles and also to act as stops to keep the wire portion in a substantially upright position during loading and unloading of the absorbent material.

The hinge portions and slots may be formed at a lower portion of the edge of the drip pan, near where the drip pan contacts the ground. In this manner, even if the apparatus is run over by a car or stepped on by a user, the slot and hinge portions will resist crushing and the drip tray will continue to be usable.

It should be noted that although disclosed herein in the preferred embodiment as being made of steel, aluminum, or the like, the present invention may also be made of other materials such as plastic or the like. A plastic drip tray may be used with a wire retaining bar, or in the alternative, a plastic retaining bar or grid may be provided to hold the absorbent material in place.

DETAILED DESCRIPTION OF THE INVENTION

Figure 1:
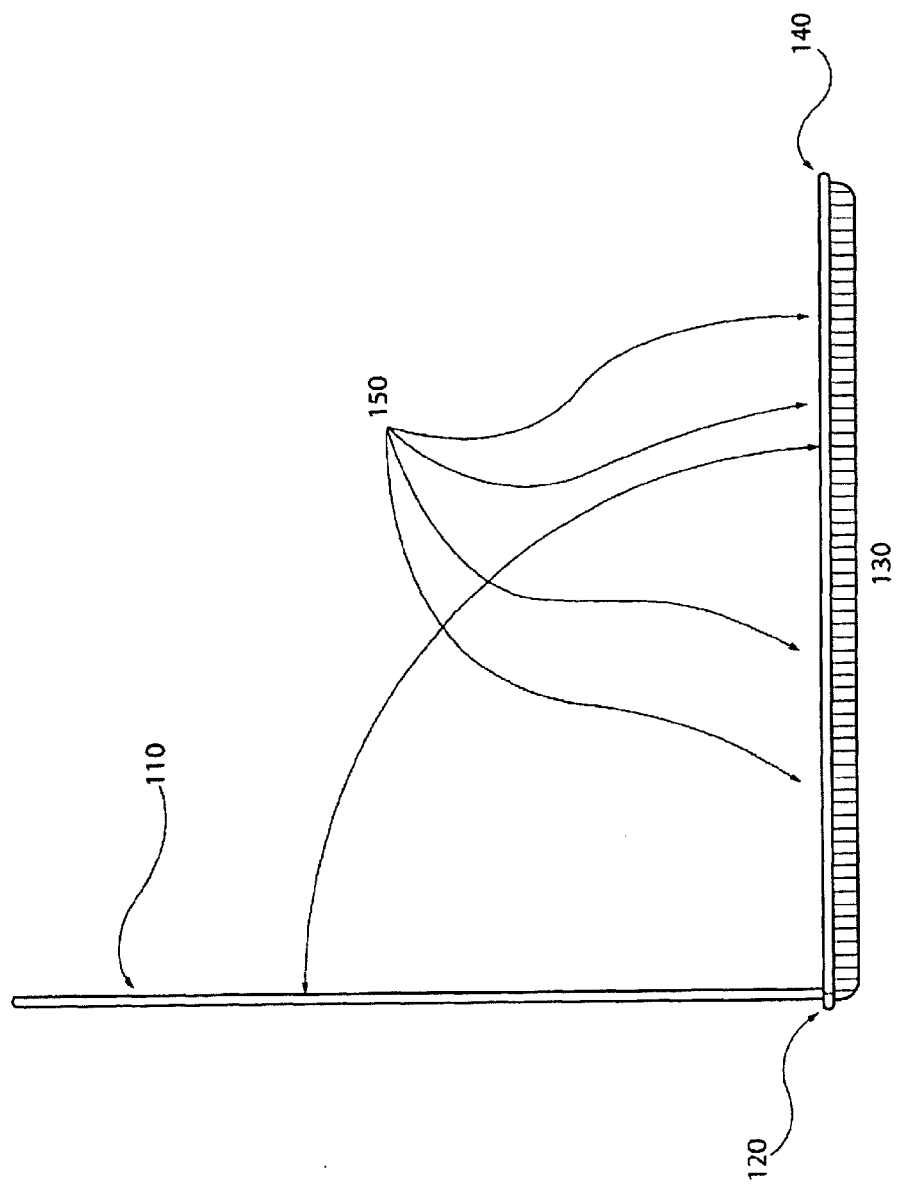
FIG. 1 is a side view of the drip tray of the present invention showing the wire retaining bar in the upright substantially vertical position and absorbent material being inserted into the drip pan.
Figure 2:
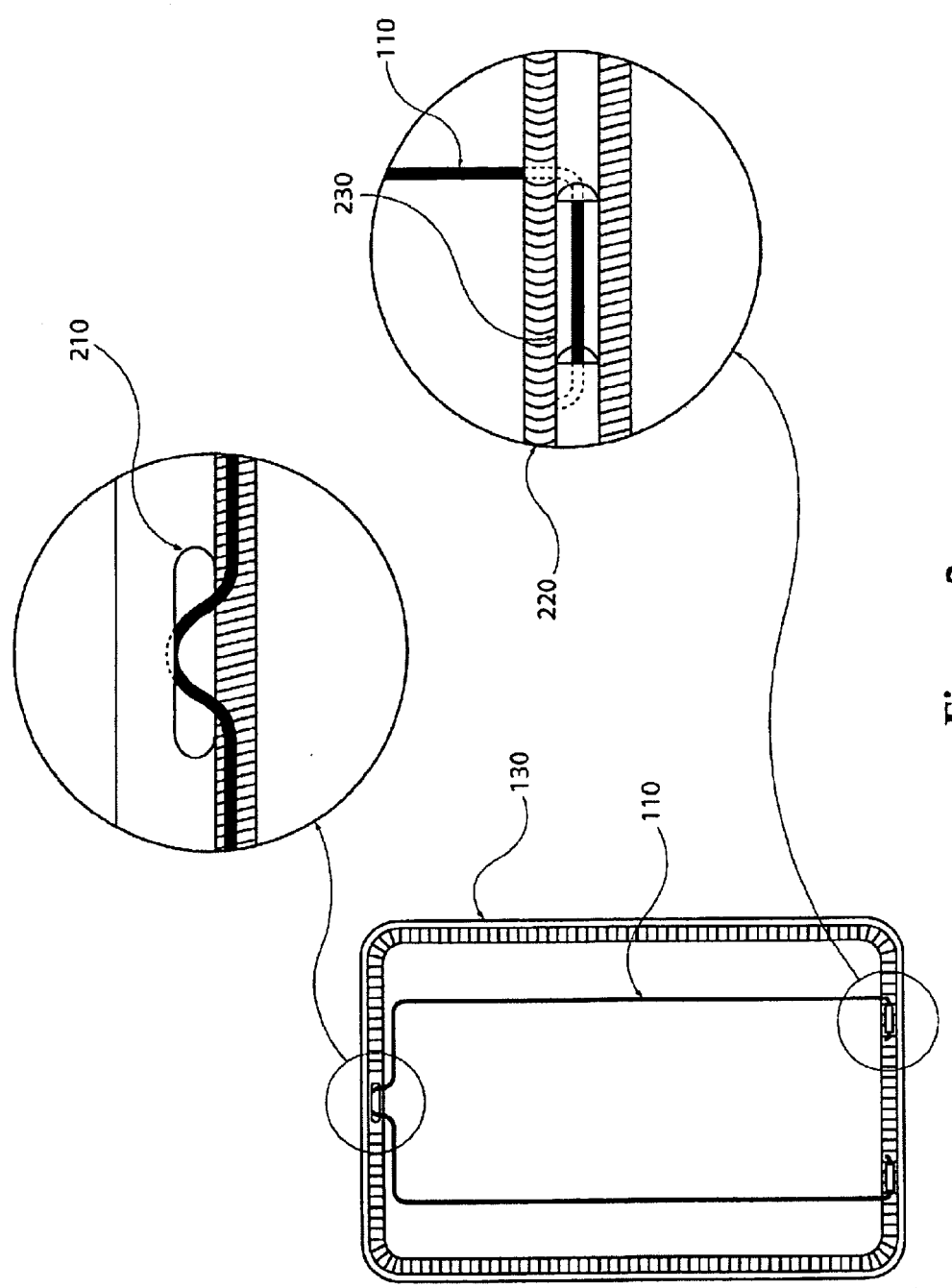
FIG. 2 is a top view of the drip tray of the present invention, illustrating the wire retaining bar locked into position, with insets illustrating the details of the locking slot and hinge design.

FIG. 1 is a side view of the drip tray of the present invention showing wire retaining bar 110 in the upright substantially vertical position and absorbent material 150 being inserted into drip pan 130. FIG. 2 is a top view of the drip tray of the present invention, illustrating wire retaining bar 110 locked into position, with insets illustrating the details of locking slot 210 and hinge design 230.

Referring to FIGS. 1 and 2, the present invention provides a roll-edge stamped metal drip pan 130 with a wire retaining bar 110 hinged at one end 120 and secured at another end 140 by a locking slot 210. Wire retaining bar 110 holds an absorbent material 150 (e.g., newspaper or the like) in drip pan 130. Wire retaining bar 110 may be provided at a distance (e.g., 2"–8") away from the edge of drip pan 130 to as to prevent absorbent material 150 from blowing out of the pan.

In use, wire retaining bar 110 may be released from its locking slot 210 an one end 140, and the bar hinged upwards to a substantially vertical position as illustrated in FIG. 1. In the upward position, wire retaining bar 110 is prevented from falling backwards by bends in retaining bar hinge portion 230. Thus, any oil on wire retaining bar 110 will tend to drip back into the metal drip pan 130.

Once absorbent material 150, such as newspaper, cloth, other types of paper, or specialized absorbent diaper-like materials known in the art is inserted into the pan, wire retaining bar 110 may be lowered into position and locked into place using one or more locking slots 210 which accept a suitably formed wire portion of wire retaining bar 110.

When the drip tray of the present invention is ready to be emptied, wire retaining bar 110 is again released and moved into its upward, substantially vertical position as illustrated in FIG. 1. Absorbent material 150 may be placed into a plastic bag or the like and easily disposed of without creating further spills, drips or leaks. Drip pan 130 may be reloaded with fresh absorbent material 150 and re-used.

The drip tray of the present invention may be readily, easily, and inexpensively manufactured. An existing drip pan 130 such as that made by AUTO TREND PRODUCTS noted above, may be suitably modified to form the present invention (as in the inventor's prototype) or a specially designed drip pan 130 may be used. In the preferred embodiment, a stamped, rolled-edge 220 drip pan 130 may be used as such pans may be readily mass-produced inexpensively and easily. Alternatively, other types of pans may be used, such as ones made from flat metal stock with bent edges and corner seams or the like.

The pan is modified for the present invention by cutting, punching, milling, or otherwise forming a slot or slots 210 into one edge of drip pan 130 to form locking slot(s) 210 for holding wire retaining bar 110 in place, as illustrated in the top inset of FIG. 2. Locking slot 210 may be approximately ½" to 2" in length or other suitable length. At another end of drip pan 130, a hinge or hinges may be formed by punching, milling, or otherwise forming two holes (for each hinge) in the pan edge and then deforming a portion of the pan edge for form a hinge receptacle 130 for accepting a portion of wire retaining bar 110, as illustrating the lower inset in FIG. 2.

Wire retaining bar 110 may be suitably formed from metal wire stock (e.g., steel or aluminum wire approximately ⅛" to ¼" in diameter). The metal wire may be bent into a roughly rectangular shape following the contours of drip pan 130, as illustrated in FIG. 2, however generally smaller in size so as to secure absorbent material 150 at a distance (e.g., 2" to 8", depending upon pan size) from the edge of the pan in order to form wire retaining bar 110.

At one end of wire retaining bar 110, a dimple or dimples may be bent into the wire (as illustrated in FIG. 2) so as to interact with locking slot(s) 210. At the other end of wire retaining bar 110, end portions may be bent and fed through the hinge receptacle(s) 230 of drip pan 130. End portions of wire retaining bar 110 may be bent at an angle to prevent the end portions from falling out of hinge receptacles 230 and also to act as stops to keep wire retaining bar 110 in a substantially upright position during loading and unloading of absorbent material 150.

Hinge receptacles 230 and locking slot(s) 210 may be formed at a lower portion of the edge of drip pan 130, near where the drip pan 130 contacts the ground. In this manner, even if the apparatus is run over by a car or stepped on by a user, locking slot(2) 210 and hinge receptacles 230 will resist crushing and the drip tray of the present invention will continue to be usable. Wire retaining bar 110, inserted into hinge receptacles 230 and locking slot(s) 210 will prevent hinge receptacles 230 and locking slot(s) 210 from being crushed and excessively deformed under the weight of a vehicle or user.

It should be noted that although disclosed herein in the preferred embodiment as being made of steel, aluminum, or the like, the present invention may also be made of other materials such as plastic or the like. A plastic drip pan may be used with a wire retaining bar 110, or in the alternative, a plastic retaining bar or grid may be provided to hold absorbent material 150 in place.

Moreover, various sizes of drip pan 130 may be used depending upon application and desired coverage. For example, the 18" by 24" size disclosed above may be used, as this is an existing pan size readily and inexpensively available. However, longer pans may be used to catch transmission leaks, or smaller pans may be used to catch industrial valve leaks and the like.

In addition, the drip pan of the present invention may also be used as an animal waste pan. Newspaper or other absorbent material may be placed in the pan and the animal may be trained to use the pan as a pet bathroom.

While the preferred embodiment and various alternative embodiments of the invention have been disclosed and described in detail herein, it may be apparent to those skilled in the art that various changes in form and detail may be made therein without departing from the spirit and scope thereof.

I claim:
1. A drip tray, comprising:
a drip pan provided with at least one locking slot at a first end and at least one hinge receptacle at a second end; and
a retaining bar hinged at the at least one hinge receptacle at the second end of the drip tray and secured at the first end by the locking slot, the wire retaining bar retaining an absorbent material in the drip pan, the wire retaining bar provided at a distance away from the edge of the drip pan to as to prevent the absorbent material from blowing out of the pan.

2. The drip tray of claim 1, wherein the at least one locking slot and the at least one hinge receptacle are formed at a bottom edge of the drip pan so as to resist crushing and deformation when weight is placed on the drip tray.

3. A drip tray, comprising:
a drip pan provided with at least one locking slot at a first end and at least one hinge receptacle at a second end; and
a retaining bar hinged at the at least one hinge receptacle at the second end of the drip tray and secured at the first end by the locking slot, the retaining bar retaining an absorbent material in the drip pan, the retaining bar provided at a distance away from the edge of the drip pan to as to prevent the absorbent material from blowing out of the pan,
wherein the at least one locking slot and the at least one hinge receptacle are formed at a bottom edge of the drip pan so as to resist crushing and deformation when weight is placed on the drip tray, and
wherein the retaining bar may be released from said at least one locking slot at the first end, and the retaining bar hinged upwards to a substantially vertical position, said retaining bar further comprising bend portions in the retaining bar for preventing the wire retaining bar from falling over backwards from the substantially vertical position.

4. The drip tray of claim 3, wherein the retaining bar comprises a wire retaining bar formed from metal wire stock.

5. The drip tray of claim 4, wherein said locking slot comprises a slot formed in an edge of the drip pan.

6. The drip tray of claim 5, wherein said at least one hinge receptacle comprises two holes formed in and edge of the drip pan with a portion between the two holes dimpled outward so as to accept a portion of the retaining bar.

7. The drip tray of claim 6, wherein the drip pan comprises a rolled-edge metal drip pan.

8. A method of containing fluid leaks, comprising the steps of:
providing a drip pan underneath a source of fluid leaks, the drip pan provided with at least one locking slot at a first end and at least one hinge receptacle at a second end and a wire retaining bar hinged at the at least one hinge receptacle at the second end of the drip tray and secured at the first end by the locking slot, and
retaining, with the wire retaining bar, an absorbent material in the drip pan, the wire retaining bar provided at a distance away from the edge of the drip pan to as to prevent the absorbent material from blowing out of the pan.

9. The method of claim 8, wherein the at least one locking slot and the at least one hinge receptacle are formed at a bottom edge of the drip pan so as to resist crushing and deformation when weight is placed on the drip tray.

10. A method of containing fluid leaks, comprising the steps of:
providing a drip pan underneath a source of fluid leaks, the drip pan provided with at least one locking slot at a first end and at least one hinge receptacle at a second end and a retaining bar hinged at the at least one hinge receptacle at the second end of the drip tray and secured at the first end by the locking slot,
retaining, with the retaining bar, an absorbent material in the drip pan, the retaining bar provided at a distance away from the edge of the drip pan to as to prevent the absorbent material from blowing out of the pan,
releasing the retaining bar from the at least locking slot at the first end,
hinging the retaining bar hinged upwards to a substantially vertical position wherein the retaining bar further comprises bend portions in the retaining bar for preventing the retaining bar from falling over backwards from the substantially vertical position, and
removing the absorbent material from the drip tray and disposing the absorbent material;
wherein the at least one locking slot and the at least one hinge receptacle are formed at a bottom edge of the drip pan so as to resist crushing and deformation when weight is placed on the drip tray.

11. A method of making a drip tray, comprising the steps of:
forming a drip pan with at least one locking slot at a first end and at least one hinge receptacle at a second end, and
forming a wire retaining bar hinged at the at least one hinge receptacle at the second end of the drip tray and secured at the first end by the locking slot, the wire retaining bar retaining an absorbent material in the drip pan, the wire retaining bar provided at a distance away from the edge of the drip pan to as to prevent the absorbent material from blowing out of the pan.

12. The method of claim 11, wherein the at least one locking slot and the at least one hinge receptacle are formed at a bottom edge of the drip pan so as to resist crushing and deformation when weight is placed on the drip tray.

13. A method of making a drip tray, comprising the steps of:
forming a drip pan with at least one locking slot at a first end and at least one hinge receptacle at a second end, and
forming a retaining bar hinged at the at least one hinge receptacle at the second end of the drip tray and secured at the first end by the locking slot, the retaining bar retaining an absorbent material in the drip pan, the retaining bar provided at a distance away from the edge of the drip pan to as to prevent the absorbent material from blowing out of the pan, said step of forming the retaining bar further comprising the step of forming bend portions in the retaining bar to prevent the retaining bar from falling over backwards from the substantially vertical position;
wherein the at least one locking slot and the at least one hinge receptacle are formed at a bottom edge of the drip pan so as to resist crushing and deformation when weight is placed on the drip tray, and
wherein the retaining bar may be released from said at least one locking slot at the first end, and the retaining bar hinged upwards to a substantially vertical position.

14. The method of claim 13, wherein said step of forming the retaining bar further comprises the step of forming the retaining bar from metal wire stock.

15. The method of claim 14, wherein said step of forming a drip pan further comprising the step of:
forming said locking slot as a slot formed in an edge of the drip pan.

16. The method of claim 15, wherein said step of forming a drip pan further comprises the step of:
forming said at least one hinge receptacle as two holes formed in and edge of the drip pan with a portion between the two holes dimpled outward so as to accept a portion of the retaining bar.

17. The method of claim 16, wherein said step of forming the drip pan comprises the steps of stamping a drip pan from a metal sheet, and forming a rolled-edge around the perimeter of the drip pan.

18. A drip tray, comprising:

a drip pan provided with at least one locking slot at a first end and at least one hinge receptacle at a second end; and a retaining bar hinged at the at least one hinge receptacle at the second end of the drip tray and secured at the first end by the locking slot, the retaining bar retaining an absorbent material in the drip pan, the retaining bar provided at a distance away from the edge of the drip pan to as to prevent the absorbent material from blowing out of the pan, wherein the retaining bar may be released from said at least one locking slot at the first end, and the retaining bar hinged upwards to a substantially vertical position, said retaining bar further comprising bend portions in the retaining bar for preventing the wire retaining bar from falling over backwards from the substantially vertical position.

19. A method of containing fluid leaks, comprising the steps of:

providing a drip pan underneath a source of fluid leaks, the drip pan provided with at least one locking slot at a first end and at least one hinge receptacle at a second end and a retaining bar hinged at the at least one hinge receptacle at the second end of the drip tray and secured at the first end by the locking slot, retaining, with the retaining bar, an absorbent material in the drip pan, the retaining bar provided at a distance away from the edge of the drip pan to as to prevent the absorbent material from blowing out of the pan, releasing the retaining bar from the at least locking slot at the first end, hinging the retaining bar hinged upwards to a substantially vertical position wherein the retaining bar further comprises bend portions in the retaining bar for preventing the retaining bar from falling over backwards from the substantially vertical position, and removing the absorbent material from the drip tray and disposing the absorbent material.

20. A method of making a drip tray, comprising the steps of:

forming a drip pan with at least one locking slot at a first end and at least one hinge receptacle at a second end, and forming a retaining bar hinged at the at least one hinge receptacle at the second end of the drip tray and secured at the first end by the locking slot, the retaining bar retaining an absorbent material in the drip pan, the retaining bar provided at a distance away from the edge of the drip pan to as to prevent the absorbent material from blowing out of the pan, said step of forming the retaining bar further comprising the step of forming bend portions in the retaining bar to prevent the retaining bar from falling over backwards from the substantially vertical position;

wherein the retaining bar may be released from said at least one locking slot at the first end, and the retaining bar hinged upwards to a substantially vertical position.

* * * * *